United States Patent
Kokko et al.

(10) Patent No.: US 12,024,602 B2
(45) Date of Patent: Jul. 2, 2024

(54) PROCESS FOR COMPOUNDING A THERMOPLASTIC COMPOSITION COMPRISING PERFORMANCE ADDITIVES FOR USE IN ADDITIVE MANUFACTURING

(71) Applicant: INGEVITY UK LTD., Cheshire (GB)

(72) Inventors: Magnus Kokko, Perstorp (SE); Emelie Ryden, Malmo (SE); Dzina Kleshchanok, Eslov (SE)

(73) Assignee: INGEVITY UK LTD, Cheshire (GB)

( * ) Notice: Subject to any disclaimer, the term of this patent is extended or adjusted under 35 U.S.C. 154(b) by 699 days.

(21) Appl. No.: 17/294,608

(22) PCT Filed: Nov. 21, 2019

(86) PCT No.: PCT/EP2019/082031
§ 371 (c)(1),
(2) Date: May 17, 2021

(87) PCT Pub. No.: WO2020/104570
PCT Pub. Date: May 28, 2020

(65) Prior Publication Data
US 2022/0010080 A1    Jan. 13, 2022

(30) Foreign Application Priority Data

Nov. 21, 2018 (SE) .................................. 1830344-6

(51) Int. Cl.
| | |
|---|---|
| *B33Y 70/00* | (2020.01) |
| *B29B 7/00* | (2006.01) |
| *B29B 7/90* | (2006.01) |
| *B29B 9/12* | (2006.01) |
| *C08J 3/00* | (2006.01) |
| *C08J 3/20* | (2006.01) |
| *B29K 67/00* | (2006.01) |
| *B29K 509/00* | (2006.01) |

(52) U.S. Cl.
CPC ............... *C08J 3/201* (2013.01); *B29B 7/007* (2013.01); *B29B 7/90* (2013.01); *B29B 9/12* (2013.01); *B33Y 70/00* (2014.12); *C08J 3/005* (2013.01); *B29K 2067/046* (2013.01); *B29K 2509/00* (2013.01); *B29K 2995/0088* (2013.01); *C08J 2367/04* (2013.01); *C08J 2467/04* (2013.01)

(58) Field of Classification Search
CPC ................................ C08L 67/04; C08K 3/013
See application file for complete search history.

(56) References Cited

U.S. PATENT DOCUMENTS

| | | | | |
|---|---|---|---|---|
| 2001/0007883 | A1* | 7/2001 | Willett | ...................... C08L 3/02 |
| | | | | 525/437 |
| 2016/0185920 | A1* | 6/2016 | Pearson | ................... C08J 3/203 |
| | | | | 523/124 |
| 2016/0333147 | A1* | 11/2016 | Ferreira | ................. C12N 11/18 |
| 2018/0112043 | A1* | 4/2018 | Janssen | ................ B29C 48/402 |
| 2018/0127554 | A1* | 5/2018 | Mohanty | ................ C08K 11/00 |
| 2018/0282489 | A1* | 10/2018 | Baer | ....................... A61L 27/18 |
| 2018/0327589 | A1* | 11/2018 | Marcille | ................. C08L 67/04 |
| 2022/0010080 | A1* | 1/2022 | Kokko | .................... B29B 7/007 |

FOREIGN PATENT DOCUMENTS

| | | | | |
|---|---|---|---|---|
| JP | 2009138123 | A | 6/2009 | |
| JP | 2017222846 | A | 12/2017 | |
| JP | 2018525457 | A | 9/2018 | |
| SE | 1730144 | A1 * | 10/2018 | ........... B29C 64/124 |
| SE | 1730144 | A1 | 10/2018 | |

OTHER PUBLICATIONS

Hassok, A et al.; "Characterization and Mechanical Properties of Poly(lactic acid)/Poly(e-caprolactone)/Organoclay Nanocomposites Prepared by Melt Compounding" In: Polymer Engineering and Science, Aug. 2006, 46:8 Abstract Only.
International Search Report for International Application No. PCT/EP2019/082031, International Filing Date Nov. 21, 2019, Date of Mailing Mar. 12, 2020, 7 pages.
Mofokeng, J.P. et al.; "Morphology and thermal degradation studies of melt-mixed poly(lactic acid) (PLA)/poly(e-caprolactone) (PCL) biodegradable polymer blend nanocomposites with TiO2 as filler"; Polymer Testing, 45 (2015), p. 93-100.
Semba, Takeshi et al.; "Effect of Compounding Procedure on Mechanical Properties and Dispersed Phase Morphology of Poly(lactic acid)/Polycaprolactone Blends Containing Peroxide"; Journal of Applied Polymer Science, V. 103, p. 1066-1074, 2007.
Written Opinion for International Application No. PCT/EP2019/082031, International Filing Date Nov. 21, 2019, Date of Mailing Mar. 12, 2020, 6 pages.

* cited by examiner

Primary Examiner — Peter A Salamon
(74) Attorney, Agent, or Firm — Bryan D. Zerhusen, Esq.; Nicholas R. Herrel, Esq.; CANTOR COLBURN LLP

(57) ABSTRACT

A process for compounding a thermoplastic composition comprising performance additives for use in additive manufacturing.

11 Claims, No Drawings

PROCESS FOR COMPOUNDING A THERMOPLASTIC COMPOSITION COMPRISING PERFORMANCE ADDITIVES FOR USE IN ADDITIVE MANUFACTURING

CROSS-REFERENCE TO RELATED APPLICATIONS

This application is a National Stage application of PCT/EP2019/082031, filed Nov. 21, 2019, which claims the benefit of Swedish Patent Application No. 1830344.6, filed Nov. 21, 2018, both of which are incorporated by reference in their entirety herein.

BACKGROUND

1. Field of Discovery

The present invention refers to a process for compounding a thermoplastic composition comprising performance additives for use in additive manufacturing.

2. Background Information

Compound of thermoplastic materials is well known since long foremost for fossil-based thermoplastic materials like polyvinyl chloride (PVC), high density polyethylene (HDPE), polystyrene (PS), acrylonitrile butadiene styrene co-polymer (ABS) and polypropylene (PP). The above materials are often used in compositions where additives like talcum is used. The above materials are known for their stability as they are not prone to hydrolyzation i.e. breakdown of the polymeric chains.

Bio-renewable thermoplastic materials such polylactic acid esters (PLA) are becoming increasingly popular today due to the valued carbon footprint. PLA do however have several drawbacks as a material as the mechanical properties are not on par with what the consumers are used to. It has showed possible to overcome these drawbacks by using PLA in compositions together with other thermoplastic materials as well as organic and non-organic performance additives. Such compositions can be achieved through compounding. The compounding schemes used so far will cause problems with these thermoplastic materials as they will cause thermal and hydrolytic degradation of the materials as well as resulting in inferior dispersion of the performance additives. All this will result in compositions that will not live up to their full potential. There is accordingly a great need for an improved compounding process for these materials.

SUMMARY

Accordingly, the invention refers to a process for compounding a thermoplastic composition comprising performance additives for use in additive manufacturing the process comprising a screw compounder having transport portions, kneader portions, locking portions, material inlets and degassing sections. The invention is characterized in that the process comprising the steps of:
  a) Adding a thermoplastic composition comprising 50-95 parts per weight of PLA (Poly Lactic Acid) with a weight average molecular weight in the range 50.000 $M_w$-150.000 $M_w$ and 5-50 parts per weight of PCL (Poly CaproLactone) with a weight average molecular weight in the range 10.000 $M_w$-120.000 $M_w$ to a first material inlet of the screw compounder. The first inlet is arranged in a first section of the screw compounder having a temperature below 60° C. The thermoplastic composition is transported through transport portions to a first kneader portion having a temperature in the range 150-200° C., said first kneader portion being provided with a first degassing section.
  b) Transporting the thermoplastic composition through means of a transport section to a second material inlet where a performance additive composition selected from the group consisting of; $CaCO_3$, mica, talcum, cellulose, dolomite, starch, aluminium trihydrate, graphite, graphene, graphene oxide, graphyne, graphdiyne and combinations thereof is added. Said composition and performance additive composition is then transported to a second kneader section having a temperature in the range 150-200° C. Said performance additive loaded thermoplastic composition is then transported through a transport section opening up into an open transport section having a degassing section followed by a tight transport section where the temperature is in the range 120-150° C. followed by a further transport section where the temperature is in the range 120-150° C. whereupon the performance additive loaded thermoplastic composition is cooled and pelletized.

DETAILED DESCRIPTION

For the sake of clarity the expression "open transport section" is to be interpreted as a section of the screw compounder where the volume available for the thermoplastic material is larger than that of the kneader section or transport section, hence allowing the thermoplastic material to expand. This can for example be achieved by having an increased pitch and/or larger outer to inner diameter ratio of the screw.

The expression "tight transport section" is to be interpreted as a section of the screw compounder where the volume available for the thermoplastic material is smaller than that of the "open transport section" or transport section, hence not allowing the thermoplastic material to expand, or even compressing the thermoplastic material. This can for example be achieved by having a decreased pitch and/or smaller outer to inner diameter ratio of the screw.

The PLA and PCL is suitably dried to a water content below 400 ppm, advantageously below 200 ppm, preferably below 100 ppm before compounding.

The first degassing section is suitably assisted by vacuum in the range 10-800 mbar.

According to a preferred embodiment of the invention, the temperature range in the first section is below 50° C.

According to one embodiment of the invention the performance additive is added through a side feeder.

The invention also relates to a two-step process adapted to the fact that many compounders will have equipment that is not able to handle multiple thermoplastic materials together with powder materials such as for example $CaCO_3$. They will furthermore not have equipment for drying powder materials such as the performance additives herein disclosed. Most compounders will however, have the ability to dry granulate materials in the form that thermoplastic materials normally are supplied.

In the first step of a process for compounding a thermoplastic composition comprising performance additives for use in additive manufacturing the process comprising a screw compounder having transport portions, kneader portions, locking portions, material inlets and degassing sections, the process is characterized in that it comprises the steps of;
  a) Adding a thermoplastic composition comprising PCL with a weight average molecular weight in the range 10.000 $M_w$-150.000 $M_w$ to a first material inlet of the screw compounder. The first inlet being arranged in a first section of the screw compounder having a temperature below 60° C., the thermoplastic composition being transported through transport portions to a first kneader portion having a temperature in the range 50-160° C. Said first kneader portion is provided with a first degassing section,
  b) Transporting the thermoplastic composition through means of a transport section to a second material inlet where a performance additive composition selected from the group consisting of; $CaCO_3$, mica, talcum, cellulose, dolomite, starch, aluminium trihydrate, graphite, graphene, graphene oxide, graphyne, graphdiyne and combinations thereof is added. Said composition and performance additive composition is transported to a second kneader section having temperature in the range 80-160° C. Said performance additive loaded thermoplastic composition is then transported through a transport section opening up into an open transport section having a degassing section followed by a tight transport section where the temperature is in the range 100-140° C. followed by a further transport section where the temperature is in the range 100-120° C. whereupon the performance additive loaded thermoplastic composition is pelletized and cooled.

The temperature range in the first section is suitably below 50° C.

The performance additive composition is preferably selected from the group consisting of; $CaCO_3$, mica, talcum, cellulose, dolomite, starch, aluminium trihydrate and combinations thereof and wherein the performance additive makes up 30-80% by weight of the performance additive loaded thermoplastic composition. The PCL then suitably have a weight average molecular weight in the range 10.000 $M_w$-35.000 $M_w$.

In one embodiment of the invention the performance additive composition is selected from the group consisting of; $CaCO_3$, mica, talcum, cellulose, dolomite, starch, aluminium trihydrate and combinations thereof and wherein the performance additive makes up 30-58% by weight of the performance additive loaded thermoplastic composition. The PCL then suitably have a weight average molecular weight in the range 10.000 $M_w$-150.000 $M_w$.

In one embodiment of the invention the performance additive composition is selected from the group consisting of; $CaCO_3$, mica, talcum, cellulose, dolomite, starch, aluminium trihydrate and combinations thereof and wherein the performance additive makes up 40-58% by weight of the performance additive loaded thermoplastic composition. The PCL then suitably have a weight average molecular weight in the range 40.000 $M_w$-120.000 $M_w$.

According to a special embodiment of the above composition, said composition further comprises 0.1-3% by weight of a carbon compound selected from the group consisting of, graphite, graphene, graphene oxide, graphyne, graphdiyne and combinations thereof.

According to an alternative of the embodiment above composition further comprises a nucleating agent allowing annealing treatment of a printed product. Such an annealing process is known in polylactic acid esters, and the mechanical properties such as improved impact resistance and improved e-modulus. The annealing process will also increase the softening temperature of the thermoplastic composition. It has surprisingly been found that the annealing temperature can be lowered by at least 10° C. by manufacturing a compound between PLA and PCL as described above. This will radically reduce the risk of warping and other deformations of the printed product during this annealing process.

The cellulose disclosed is in the form of fibres. These cellulose fibres are preferably nano-fibrillated cellulose fibres.

The above first step of the process can be performed by more specialized and specially qualified compounder companies which are equipped with advanced compounding equipment as well as facilities to dry powders such as the herein disclosed performance additives to a water content below 400 ppm. The composition achieved in above first step of the process can then be delivered to any compounder company, even those who do not have advanced equipment.

In accordance with one embodiment of the invention the additive loaded thermoplastic composition obtained is dried to a water content below 400 ppm and that PLA with a weight average molecular weight in the range 50.000 $M_w$-150.000 $M_w$ is dried to a water content below 400 ppm whereupon;
  i) The dried PLA and the dried performance additive loaded thermoplastic composition is added to a first material inlet of the screw compounder. The first inlet is arranged in a first section of the screw compounder having a temperature below 60° C. The thermoplastic composition is transported through transport portions to a first kneader portion having a temperature in the range 150-200° C., said first kneader portion being provided with a first degassing section.
  ii) Said performance additive loaded thermoplastic composition is transported through a transport section opening up into an open transport section having a degassing section followed by a tight transport section where the temperature is in the range 120-170° C. followed by a further transport section where the temperature is in the range 120-150° C. whereupon the performance additive loaded thermoplastic composition is cooled and pelletized.

The above described method is the preferred modus of operation as it will secure the best dispersion possible of the performance additive in the composition without causing significant molecular breakdown.

In accordance with an alternative embodiment of the invention the additive loaded thermoplastic composition obtained is dried to a water content below 400 ppm and that PLA with a weight average molecular weight in the range 50.000 $M_w$-150.000 $M_w$ is dried to a water content below 400 ppm whereupon;
  i) The dried PLA is added to a first material inlet of the screw compounder, the first inlet being arranged in a first section of the screw compounder having a temperature below 100° C. The thermoplastic composition is then transported through transport portions to a first kneader portion having a temperature in the range 150-200° C., said first kneader portion being provided with a first degassing section.
  ii) The thermoplastic composition is then transported through means of a transport section to a second material inlet where the dried performance additive loaded thermoplastic composition is added, transporting said composition and performance additive composition to a second kneader section having a temperature in the range 150-200° C. Said performance additive loaded thermoplastic composition is then transported through a transport section opening up into an open transport section having a degassing section followed by a tight transport section where the temperature is in the range 120-170° C. followed by a further transport section where the temperature is in the range 120-150° C. whereupon the performance additive loaded thermoplastic composition is cooled and pelletized.

The composition achieved in accordance with the present invention particularly suited use in additive manufacturing such as selective laser sintering (SLS) and fused deposition modelling (FDM™). The composition will accordingly be processed further, either into micro-pellets or powder for SLS or filaments for FDM™ use. The compositions are designed to meet requirements regarding;
- processability before and during additive manufacturing, such as melt flow viscosity at specific temperature and at temperature ranges, thermal conductivity and crystallization characteristics,
- mechanical properties in manufactured products, such as impact resistance, elongation at break, softening temperature, tensile strength, crystallinity, density, thermal and electric conductivity and,
- aesthetic surface properties in manufactured products, both visual as well as tactile.

According to embodiment of the invention the above described PCL based performance additive composition may be utilized together with PLA in injection molding or film blowing. Both materials are then suitably in the form of pellets that are dried to water content below 400 ppm before being feed into the extruder.

What is claimed is:

1. A process for compounding a thermoplastic composition comprising performance additives for use in additive manufacturing, the process comprising a screw compounder having transport portions, kneader portions, locking portions, material inlets and degassing sections, the process comprising the steps of
   a) adding a thermoplastic composition comprising 50-95 parts per weight of PLA with a weight average molecular weight in the range 50.000 $M_w$-150.000 $M_w$ and 5-50 parts per weight of PCL with a weight average molecular weight in the range 10.000 $M_w$-120.000 $M_w$ to a first material inlet of the screw compounder, the first inlet being arranged in a first section of the screw compounder having a temperature below 60° C., the thermoplastic composition being transported through transport portions to a first kneader portion having a temperature in the range 150-200° C., said first kneader portion being provided with a first degassing section,
   b) transporting the thermoplastic composition through means of a transport section to a second material inlet where a performance additive composition selected from the group consisting of $CaCO_3$, mica, talcum, cellulose, dolomite, starch, aluminium trihydrate, graphite, graphene, graphene oxide, graphyne, graphdiyne and combinations thereof is added, transporting said composition and performance additive composition to a second kneader section having a temperature in the range 150-200° C., transporting said performance additive loaded thermoplastic composition through a transport section opening up into an open transport section having a degassing section followed by a tight transport section where the temperature is in the range 120-150° C. followed by a further transport section where the temperature is in the range 120-150°° C. whereupon the performance additive loaded thermoplastic composition is cooled and pelletized.

2. A process according to claim 1, wherein the PLA and PCL is dried to a water content below 400 ppm before compounding.

3. A process according to claim 1, wherein the first degassing section is assisted by vacuum in the range 10-800 mbar.

4. A process according to claim 1, wherein the temperature range in the first section is below 50° C.

5. A process according to claim 1, wherein the performance additive is added through a side feeder.

6. A process for compounding a thermoplastic composition comprising performance additives for use in additive manufacturing, the process comprising a screw compounder having transport portions, kneader portions, locking portions, material inlets and degassing sections, the process comprising the steps of
   a) adding a thermoplastic composition comprising PCL with a weight average molecular weight in the range 10.000 $M_w$-150.000 $M_w$ to a first material inlet of the screw compounder, the first inlet being arranged in a first section of the screw compounder having a temperature below 60° C., the thermoplastic composition being transported through transport portions to a first kneader portion having a temperature in the range 50-160° C., said first kneader portion being provided with a first degassing section,
   b) transporting the thermoplastic composition through means of a transport section to a second material inlet where a performance additive composition selected from the group consisting of $CaCO_3$, mica, talcum, cellulose, dolomite, starch, aluminium trihydrate, graphite, graphene, graphene oxide, graphyne, graphdiyne and combinations thereof is added, transporting said composition and performance additive composition to a second kneader section having temperature in the range 120-160° C., transporting said performance additive loaded thermoplastic composition through a transport section opening up into an open transport section having a degassing section followed by a tight transport section where the temperature is in the range 100-140° C. followed by a further transport section where the temperature is in the range 100-120° C., whereupon the performance additive loaded thermoplastic composition is pelletized and cooled.

7. A process according to claim 6, wherein the temperature range in the first section is below 50° C.

8. A process according to claim 6, wherein the performance additive composition is selected from the group consisting of $CaCO_3$, mica, talcum, cellulose, dolomite, starch, aluminium trihydrate and combinations thereof, and wherein the performance additive makes up 30-80% by weight of the performance additive loaded thermoplastic composition.

9. A process according to claim 6, wherein the performance additive composition is selected from the group consisting of $CaCO_3$, mica, talcum, cellulose, dolomite, starch, aluminium trihydrate and combinations thereof, and wherein the performance additive makes up 40-58% by weight of the performance additive loaded thermoplastic composition.

10. A process according to claim 6, wherein the additive loaded thermoplastic composition obtained is dried to a water content below 400 ppm and that PLA with a weight average molecular weight in the range 50.000 $M_w$-150.000 $M_w$ is dried to a water content below 400 ppm, whereupon
   i) the dried PLA and the dried performance additive loaded thermoplastic composition is added to a first material inlet of the screw compounder, the first inlet being arranged in a first section of the screw compounder having a temperature below 60° C., the thermoplastic composition being transported through transport portions to a first kneader portion having a temperature in the range 150-200° ° C., said first kneader portion being provided with a first degassing section,
   ii) transporting said performance additive loaded thermoplastic composition through a transport section opening up into an open transport section having a degassing section followed by a tight transport section where the temperature is in the range 120-170° C. followed by a further transport section where the temperature is in the range 120-150° C., whereupon the performance additive loaded thermoplastic composition is cooled and pelletized.

11. A process according to claim 6, wherein the additive loaded thermoplastic composition obtained is dried to a water content below 400 ppm and that PLA with a weight average molecular weight in the range 50.000 $M_w$-150.000 $M_w$ is dried to a water content below 400 ppm whereupon
   i) the dried PLA is added to a first material inlet of the screw compounder, the first inlet being arranged in a first section of the screw compounder having a temperature below 100° ° C., the thermoplastic composition being transported through transport portions to a first kneader portion having a temperature in the range 150-200° C., said first kneader portion being provided with a first degassing section,
   ii) transporting the thermoplastic composition through means of a transport section to a second material inlet where the dried performance additive loaded thermoplastic composition is added, transporting said composition and performance additive composition to a second kneader section having temperature in the range 150-200° C., transporting said performance additive loaded thermoplastic composition through a transport section opening up into an open transport section having a degassing section followed by a tight transport section where the temperature is in the range 120-170° C. followed by a further transport section where the temperature is in the range 120-150° C., whereupon the performance additive loaded thermoplastic composition is cooled and pelletized.

* * * * *